INVENTOR.
GIFFORD G. McCLAFLIN
BY
ATTORNEY

United States Patent Office 3,642,850
Patented Feb. 15, 1972

3,642,850
METHOD OF OBTAINING SOLVENT FREE ALUMINUM ALKYLS AND ALKOXIDES
Gifford G. McClaflin, Ponca City, Okla., assignor to Continental Oil Company, Ponca City, Okla.
Filed Dec. 16, 1968, Ser. No. 784,155
Int. Cl. C07f 5/06
U.S. Cl. 260—448 A          14 Claims

ABSTRACT OF THE DISCLOSURE

Fluorocarbons are disclosed as selective solvents for separating aluminum organo compounds from hydrocarbon solvents.

---

This invention is in the field of preparation of olefins and/or alcohols by growth of aluminum alkyls with an olefin such as ethylene and relates more particularly to separation of hydrocarbons from the aluminum organo compound.

It has been known for some time that aluminum alkyls such as aluminumtriethyl or aluminumdiethyl hydride or other aluminum alkyls can be reacted with olefins, generally ethylene, to produce aluminum alkyls having alkyl substituents of a greater number of carbon atoms than the original alkyl substitutents. The aluminum alkyls can be displaced to produce olefins or the aluminum alkyls can be oxidized and hydrolyzed to produce alcohols in the plasticizer or detergent range. The growth and oxidation reactions are generally carried out in the presence of a hydrocarbon solvent. It is also known that during the growth reaction some olefins are produced probably due to unwanted displacement. It is also known that during the stripping step, e.g., separation of growth product from olefins, some thermal displacement takes place. In many cases, it is desirable to recover the aluminum alkyl growth product or the aluminum alkoxide from the solvent and olefins product during the reaction. Since any thermal decomposition results in a loss of desired product, it is desirable to recover these aluminum organo compounds while minimizing the decomposition. It is also known that many of the aluminum organo compounds boil at substantially the same temperature as do the impurities. For example, aluminum triethyl and dodecene cannot be separated by thermal fractionation.

According to this invention, aluminum organo compounds are separated from hydrocarbons by selective extraction with fluorocarbons.

Figure 1:
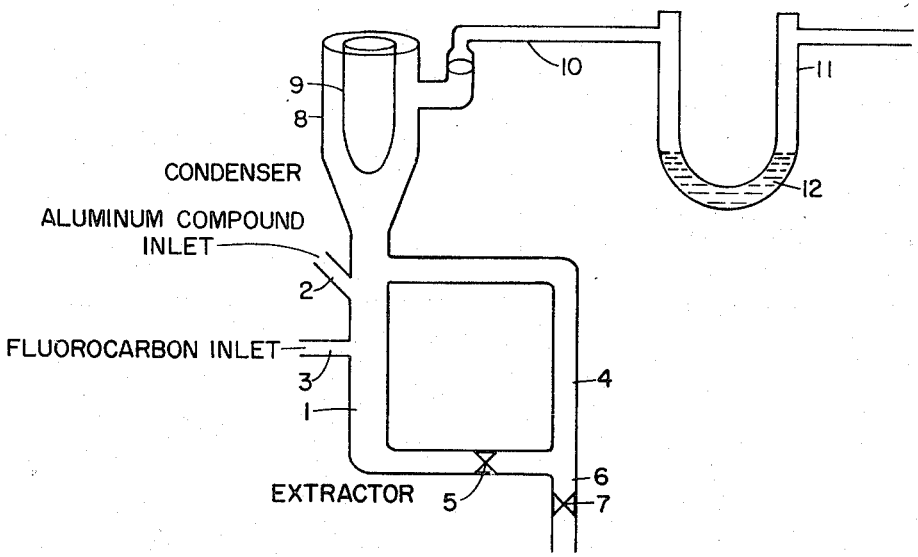
FIG. 1 is a schematic showing of a suitable batch type apparatus for carrying out the process of this invention.

As has been indicated, this invention is directed to separation of various hydrocarbons from aluminum organo compounds such as aluminumtrialkyls, aluminumdialkylhydrides, aluminumalkylidhydrides, aluminum alkyl halides and aluminum alkoxides of such compounds. The alkyl or alkoxide radicals may be the same or different and will generally contain 2 to 30 or more carbon atoms per alkyl or alkoxide substituent.

The hydrocarbons which are to be separated from the aluminum organo compound can be straight chain, branched chain, cyclic, aromatic, substituted aromatic and can be saturated or unsaturated. The hydrocarbon will generally contain 1 to 30 carbon atoms; however, this is not critical. The only limitation is that the hydrocarbon be liquid at the boiling point of the fluorocarbon utilized. Thus, if methylfluoride were utilized as the fluorocarbon the $C_{30}$ material would crystallize out. In this latter case, one would choose a high boiling fluorocarbon such as perfluoroheptane.

Typical aluminum organo compounds include aluminum trietyhl, aluminum diethyl hydride, aluminumdiethyl chloride, aluminum alkyl growth product, oxidized aluminum alkyl growth product, and the like, as well as $Al(C_2)_3$ to $Al(C_{30})_3$ and their oxides, $Al(C_2$ to $C_{30})_2$ chloride, fluoride, iodide and bromide.

boiling point of the fluorocarbon and the crystallization temperature of the hydrocarbon and aluminum compound being separated. It is necessary that the components be liquid during the extraction. It is preferred to use the perfluorocarbons, e.g., all hydrogens replaced by fluorine; however, with the hydrocarbons of 1 to 3 carbon atoms a single fluorine is operable. As the hydrocarbon becomes larger, then a greater degree of fluorination will be required. The fluorocarbon may also contain other nonreactive substituents, particularly other halides. The perfluorocarbons particularly preferred are perfluorocarbons having 4 to 20 carbon atoms and more preferably are aliphatic perfluorocarbons of 4 to 10 carbon atoms. The ratio of fluorocarbon to hydrocarbon can vary over a wide range; however, for best results I prefer to use 1.5 to 3 volumes of the fluorocarbon per volume of aluminum solution.

Examples of the preferred fluorocarbons include: perfluoro methane, perfloro ethane, perfluoro propane, perfluoro-n-butane, perfluoro-isobutane, perfluoro pentane, perfluoro hexane, perfluoro-2,2,3-trimethyl butane, perfluoro hexadecane, perfluoro cyclobutane, perfluoro cyclobutene, perfluoro cyclopentane, perfluoro cyclohexane, perfluoro methyl cyclohexane, perfluoro dimethyl cyclohexane, perfluoro-1,3,5-trimethylcyclohexane, perfluoro benzene, perfluoro toluene, perfluoroeisocosane and the like.

Examples of other operable fluorocarbons include: methylfluoride, methylenefluoride, fluoroform, monochloromonofluoro-methane, mono-bromo-difluoro-methane, monochlorotrifluoro-methane, ethylfluoride, 1,2-difluoroethane, mono-bromo-monofluoroethane, 2-monochloro-1, difluoroethane, difluoro-dichloro-ethane, tetrafluoro-di-chloroethane, 1,1,1-trifluoroethane, 1,2-difluoropropane, 1,3-difluoropropane, 1,2,3-trifluoropropane, allylfluoride, di-iodomono-fluoromethane, mono-chloromono-bromo-fluoromethane, tetrachloro-di-fluoro-ethane, n-propylfluoride, isopropylfluoride, n-amylfluoride, n-hexylfluoride, mono-fluorobenzol, meta-di-fluorobenzol, 1,2,4-trifluorobenzol, p-fluoro-bromo-benzol, o-fluorotoluol, p-fluoro-toluol, trifluorotoluol, monofluoro-cyclohexane di-fluoro-naphthalene and the like.

Referring to FIG. 1, the aluminum compound-hydrocarbon mix to be separated is introduced to chamber 1 via valve 2. The fluorocarbon is introduced to chamber 1 via valve 3. Chamber 4 is open to chamber 1 at the top and is separated from chamber 1 via valve 5 at the bottom. Product withdrawal conduit 6 is equipped with valve 7. Condenser 8 is opened to left chamber 1 and is equipped with a hollow chamber 9. The condenser 8 is opened to bubbler 11 via conduit 10. The bubbler 11 contains a liquid seal 12.

Figure 2:
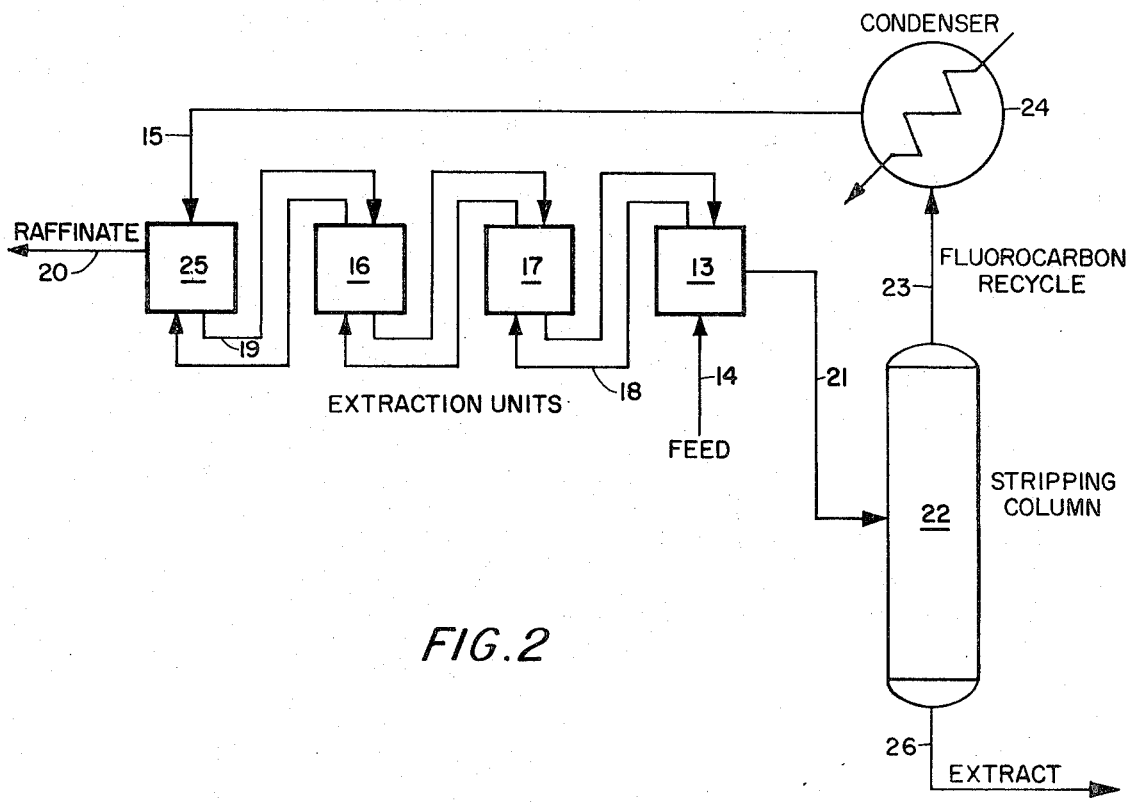
FIG. 2 is a schematic flow diagram of a suitable continuous apparatus for carrying out the process of this invention.

As will be obvious from the examples hereinafter, some separations are more difficult than others. For this reason the number of separation steps required will vary depending upon the separation and the particular fluorocarbon. FIG. 2 illustrates a continuous separation incorporating a plurality of stages. The mixture of the aluminum compound and hydrocarbon is fed into the bottom of the last stage 13 via conduit 14 while the fluorocarbon is added to the top of stage one (25) via conduit 15. The hydrocarbon from stage 13 is passed via conduit 18 to the preceding contacting stage 17 and the fluorocarbon with extracted hydrocarbon passes via conduit 19 to the next stage 16. Thus a continuous countercurrent contacting series is established for the total desired contacting steps. The aluminum compound of desired purity then is recovered via conduit 20. The fluorocarbon enriched in hydrocarbon passes via conduit 21 to stripping column 22 where the fluorocarbon evaporates and passes via conduit 23 to condenser 24 where it is condensed and passed back to the first contacting column or stage 25. The hydrocarbon is removed from column 22 via conduit 26. Additional condensers (not shown) are placed between the contacting chambers on the fluorocarbon flow as needed.

In both of the above descriptions, it is assumed that the fluorocarbon is more dense than is the hydrocarbon. The system can obviously be inverted when a light fluorocarbon is utilized.

In all of the following examples, perfluorobutane is utilized as the selective solvent in order that a comparison of ease of separation can be shown. For example, aluminum triethyl (ATE) separation from dodecene is comparatively difficult. As the data shows, as the ATE concentration increases (Example III), the more difficult the separation. Thus, by the time the last extraction stage is reached, e.g., the first stage as described, the amount of aluminum compound has reached the minimum percentage and the separation is relatively great. This is shown by comparing Examples II and III. Example I is the more normal initial feed. The system shown in FIG. 2 then yields a substantially pure hydrocarbon if sufficient stages are employed. If it is desired to obtain a substantially pure aluminum compound, then the feed flow would be reversed, e.g., the feed into chamber 25 and the hydrocarbon to aluminum compound ratio will be decreasing as the two streams reach chamber 13.

All of the following examples were run in equipment substantially as shown in FIG. 1. These show only one extraction step; however, Examples I, II and III illustrate how successive runs would improve the separation.

EXAMPLE I

Dry Ice in acetone was placed in chamber 9 of the condenser 8 in FIG. 1. The apparatus was charged in the order shown:

15 ml. perfluorobutane
Mixture:
    5 ml. (4.46 g.) ATE (aluminum triethyl)
    5 ml. (3.74 g.) dodecene The charge was magnetically stirred for ¼ hour. Stirring was stopped. Two layers appeared and stopcock 5 opened. The lower (perfluorobutane) was continuously drawn off into the side arm (right) receiver where the low boiling perfluorobutane boiled off and recondensed in condenser 9 and dropped back into the left chamber of the inverse extractor. Extraction was continued for 7 hours, at which time stopcock 5 was closed. The low boiling perfluorobutane was allowed to evaporate and was drawn off through the U-tube 11. This left 2 ml. of high boiling liquid in the right chamber and 8 ml. in the left chamber.

Analysis of the fraction showed the following:

Right chamber product 7.31% Al.
Left chamber product 13.11% Al.

The above data show that the perfluorobutane selectively removed dodecene from the mixture.

EXAMPLE II

Example I shows that the 1:1 mixture of dodecene-ATE concentrated the ATE in the left chamber and left a more dilute solution in the right chamber. This example shows the effect of separation of the more dilute solutions. The same procedure was utilized as in Example I except the extraction was continued for only 4 hours and the following charge utilized.

25 ml. perfluorobutane
12 ml. (8.0 g.) 8.95/91.05 ATE/dodecene mixture (2.02% Al)

After 4 hours extraction 4.5 ml. of high boiling product was present in the right chamber and 7.5 ml. remained in the left chamber. Analysis showed:

Right chamber product 0.46% Al
Left chamber product 2.98% Al

As can be seen, the dodecene in the right chamber was considerably improved at this initially low concentration of ATE.

EXAMPLE III

This example illustrates the effect of treating a high concentration of ATE in dodecene. The procedure was the same as in Example II. The charge was:

30 ml. perfluorobutane
10 ml. or 8.11 g. ATE/dodecene mixture (92% ATE·8% dodecene) (20.59% Al)

The right chamber contained 3 ml. (2.26 g.) of high boiling liquid and the left chamber the remaining 5.85 grams. Analysis showed:

Right chamber product 17.49% Al
Left chamber product 20.75% Al

EXAMPLE IV

This run was made to show the extraction of saturated hydrocarbons from aluminum triethyl. The procedure was the same as Example II. The charge was:

22 ml. of perfluorobutane
10 ml. (8.08 g.) ATE/undecane 54/46 weight ratio with initial Al content of 12.12%.

At the end of the run 2.75 g. extract was in the right chamber and the balance of the charge in the left chamber. Analysis showed:

Right chamber product 5.44% Al
Left chamber product 15.36% Al

The right chamber product then had an ATE/undecane weight ratio of 22.9/77.1.

Several runs were made using growth product (G.P.) in admixture with various hydrocarbons. This growth product is a mixture of aluminum alkyls wherein alkyl radicals will contain from 2 to about 30 carbon atoms following a Poisson distribution. The procedures were as in Example II.

EXAMPLE V

Charge:
    10 ml. (8.05 g.) 52.2 $AlR_3$ G.P./47.8 dodecene
    24 ml. perfluorobutane
Product:
    Right chamber product=2.73 gm. (3.9 ml.)
    Left chamber product=remainder of G.P./$C_{12}$ olefin
Analysis:

|  | Percent Al |
|---|---|
| $AlR_3$ G.P. charge | 3.10 |
| Right chamber product | <0.25 |
| Left chamber product | 4.66 |

EXAMPLE VI

The extraction was allowed to run 12 hours prior to closing the stopcock 5. The butane and perfluorobutane were allowed to boil off.

Charge:
    10 ml. n-butane
    20 ml. perfluorobutane
    5 ml. (4.4 gm.) $AlR_3$ G.P.
Products:
    Left chamber product 4.5 ml.
    Right chamber product 0.5 ml.

Each of the two products were recovered and hydrolyzed in 25% sulfuric acid. GLPC analysis on the organic hydrolyzed material (C$_{8-18}$ carbon atom region) showed the following:

|  | Area percent | | |
| --- | --- | --- | --- |
|  | Saturates | Alcohol | Olefin |
| Left chamber product | 94.1 | 5.9 | 0 |
| Right chamber product | 65. | 11.3 | 23.5 |

The alcohols resulted apparently from some oxidation of the growth product during shipping and storage.

EXAMPLE VII

Charge:
  30 ml. perfluorobutane
  15.2 ml. (11.9 g.) 53% G.P.—47% undecene mix.
Analysis:

|  | Percent Al |
| --- | --- |
| Original G.P./undecane mix | 3.14 |
| Right chamber product | <0.005 |
| Left chamber product | 3.99 |

GLPC analysis on hydrolyzed right chamber product showed 99+% undecane.

GLPC analysis on hydrolyzed left chamber product showed 33.4% undecane.

The remainder was hydrocarbon in the original AlR$_3$ material.

EXAMPLE VIII

Charge:
  10 ml. (8.52 gm.) AlR$_3$ G.P.—xylene mix
  21 ml. perfluorobutane

ANALYSIS

|  | Wt. percent Al | Wt. percent xylene |
| --- | --- | --- |
| Charge material | 3.19 | 46.4 |
| Right chamber product | 0.01 | 99.0 |
| Left chamber product | 5.13 | 14.3 |

EXAMPLE IX

Charge:
  15 ml. perfluorobutane
  5 ml. (4.35 gm.) oxidized growth product in 30 wt. percent hydrocarbon solvent.
Products:
  Right chamber 1.4 ml. (1.4 gm.)
  Left chamber 3.6 ml. (2.9 gm.)
Analysis:

|  | Percent Al |
| --- | --- |
| Al(OR)$_3$ growth product charged | 3.94 |
| Right chamber | Nil |
| Left chamber | 5.16 |

Having thus described the invention, I claim:

1. A method of separating an aluminum organo compound selected from the group consisting of aluminum alkyls, aluminum alkyl halides and aluminum alkoxides from a liquid solution comprised of said aluminum organo compound and a hydrocarbon which is liquid at the boiling point of the hereinafter said fluorocarbon and selected from the group consisting of saturated and unsaturated straight chain, branched chain, cyclic and aromatic hydrocarbons, in which said method consists of contacting said solution with a fluorocarbon in a liquid-liquid extraction system and separating the resulting fluorocarbon rich phase from the resulting aluminum organo compound rich phase.

2. The method of claim 1 wherein the fluorocarbon to aluminum organo compound and hydrocarbon solution volume ratio is at least 1.1 to 1.

3. The method of claim 1 wherein the fluorocarbon to aluminum organo compound and hydrocarbon solution volume ratio is in the range of 1.5:1 to 3:1.

4. The method of claim 3 wherein the fluorocarbon is aliphatic and contains 4 to 20 carbon atoms.

5. The method of claim 3 wherein the fluorocarbon is aliphatic and contains 4 to 10 carbon atoms.

6. The method of claim 5 wherein the aluminum compound is aluminum triethyl.

7. The method of claim 5 wherein the aluminum compound is growth product.

8. The method of claim 5 wherein the aluminum compound is oxidized growth product.

9. The method of claim 6 wherein the fluorocarbon is perfluorobutane.

10. The method of claim 7 wherein the fluorocarbon is perfluorobutane.

11. The method of claim 8 wherein the fluorocarbon is perfluorobutane.

12. A method of separating an aluminum organo compound selected from the group consisting of aluminum alkyl halides and aluminum alkoxides from a solution comprised of said aluminum organo compound and a hydrocarbon in which said method consists of contacting said solution with a fluorocarbon in a liquid-liqiud extraction system and separating the resulting fluorocarbon rich phase from the resulting aluminum organo compound rich phase.

13. The method of claim 1 wherein the fluorocarbon is subsequently separated from the previously separated fluorocarbon rich phase.

14. The method of claim 12 wherein the fluorocarbon is subsequently separated from the previously separated fluorocarbon rich phase.

References Cited

UNITED STATES PATENTS 3,412,126  11/1968  Gautreaux _____ 260—448 A
3,104,251  9/1963  Foster et al. ____ 260—448 AO TOBIAS E. LEVOW, Primary Examiner H. M. S. SNEED, Assistant Examiner U.S. Cl. X.R.

260—448 AO, 666 SA, 677 R, 677 A

PO-1050
(5/69)

UNITED STATES PATENT OFFICE
CERTIFICATE OF CORRECTION

Patent No. 3,642,850                Dated February 15, 1972

Inventor(s) Gifford G. McClaflin

It is certified that error appears in the above-identified patent and that said Letters Patent are hereby corrected as shown below:

Column 1, line 40, please change "product" to -- produced --.

Column 1, line 59, please change "aluminumalkylidhydrides" to -- aluminumalkyldihydrides --.

Column 2, line 4, please change "trietyhl" to -- triethyl --.

Column 2, line 9, before boiling, please insert -- In choosing the fluorocarbon, one must keep in mind the --.

Signed and sealed this 4th day of July 1972.

(SEAL)
Attest:

EDWARD M. FLETCHER, JR.
Attesting Officer

ROBERT GOTTSCHALK
Commissioner of Patents